US009781129B1

(12) United States Patent
Bailey et al.

(10) Patent No.: US 9,781,129 B1
(45) Date of Patent: Oct. 3, 2017

(54) AUTHENTICATING AN ENTITY

(75) Inventors: Daniel V. Bailey, Pepperell, MA (US); Lawrence N. Friedman, Arlington, MA (US); Samuel Curry, North Andover, MA (US); Yedidya Dotan, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 13/536,978

(22) Filed: Jun. 28, 2012

Related U.S. Application Data

(63) Continuation-in-part of application No. 13/435,951, filed on Mar. 30, 2012, now Pat. No. 8,904,496.

(51) Int. Cl.
*H04L 29/06* (2006.01)

(52) U.S. Cl.
CPC .................. *H04L 63/107* (2013.01)

(58) Field of Classification Search
CPC ..................................................... H04L 63/107
USPC ........................................................ 726/3, 6
See application file for complete search history.

(56) References Cited

U.S. PATENT DOCUMENTS

| | | | | |
|---|---|---|---|---|
| 6,370,629 B1* | 4/2002 | Hastings | ............. | G06F 21/6218 711/153 |
| 6,563,910 B2* | 5/2003 | Menard | ............ | H04L 63/08 379/42 |
| 6,691,232 B1* | 2/2004 | Wood | .................. | H04L 63/0815 726/18 |
| 7,908,645 B2* | 3/2011 | Varghese et al. | ................. | 726/4 |
| 8,352,601 B2* | 1/2013 | Piccionelli | .......... | G06F 17/3087 709/225 |
| 8,538,389 B1* | 9/2013 | Evans | ..................... | H04L 67/18 345/156 |
| 2005/0097320 A1* | 5/2005 | Golan | ..................... | G06F 21/40 713/166 |
| 2007/0050850 A1* | 3/2007 | Katoh | ..................... | G06F 21/31 726/27 |
| 2008/0172715 A1* | 7/2008 | Geiger | ..................... | G06F 21/32 726/1 |
| 2009/0325576 A1* | 12/2009 | Moreillon | ..................... | 455/434 |
| 2010/0048167 A1* | 2/2010 | Chow | ............... | H04L 29/12594 455/410 |
| 2010/0082982 A1* | 4/2010 | Suzuki | .................... | G06F 21/34 713/168 |

* cited by examiner

*Primary Examiner* — Andrew Georgandellis
(74) *Attorney, Agent, or Firm* — Krishnendu Gupta; Jason A. Reyes

(57) ABSTRACT

There is disclosed a method and system for use in authenticating an entity. An authentication request is received from the entity. An input signal is received from a communications device associated with the entity. The input signal comprises the current location of the communications device. The current location of the communications device is derived from the input signal. Based on the current location of the communications device, an event is detected at substantially the same location as the current location of the communications device. An analysis is performed between the current location of the communications device and the event. An authentication result is generated based on the analysis between the current location of the communications device and the event. The authentication result can be used for authenticating the entity.

4 Claims, 4 Drawing Sheets

AUTHENTICATING AN ENTITY

RELATED APPLICATION

This application is a continuation-in-part application claiming priority to co-pending U.S. patent application Ser. No. 13/435,951, filed Mar. 30, 2012, entitled "AUTHENTICATING AN ENTITY IN CONNECTION WITH A COMPUTERIZED RESOURCE", the entirety of which patent application is hereby incorporated by reference herein.

TECHNICAL FIELD

The present invention relates to authenticating an entity.

BACKGROUND OF THE INVENTION

Generally, security systems employ an identity-based authentication scheme to verify the identity of an entity before granting access to a computer system or a computerized resource. One goal of such security systems is to accurately determine identity so that an unauthorized party cannot gain access. Security systems can use one or more of several factors, alone or in combination, to authenticate entities. For example, security systems can be based on something that the entity knows, something the entity is or something that the entity has.

Examples of something an entity knows are a code word, password, personal identification number ("PIN") and the like. Examples of something the entity is include a distinct characteristic or attribute known as a biometric. An example of something an entity possesses is a physical or digital object, referred to generally as a token, that is unique, or relatively unique, to the user.

However, it will be appreciated that the threat in connection with security systems is increasing. For example, a password or token may easily be compromised. Indeed, even though it is a little more difficult, it is possible to fraudulently create a copy of a biometric. For example, for voice authentication a user's voice may be recorded and later used to initiate authentication. Therefore, there is a need for further security measures when verifying the identity of an entity before granting access to a computer system or a computerized resource.

SUMMARY OF THE INVENTION

There is disclosed a method and system for use in authenticating an entity. An authentication request is received from the entity. An input signal is received from a communications device associated with the entity. The input signal comprises the current location of the communications device. The current location of the communications device is derived from the input signal. Based on the current location of the communications device, an event is detected at substantially the same location as the current location of the communications device. An analysis is performed between the current location of the communications device and the event. An authentication result is generated based on the analysis between the current location of the communications device and the event. The authentication result can be used for authenticating the entity.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
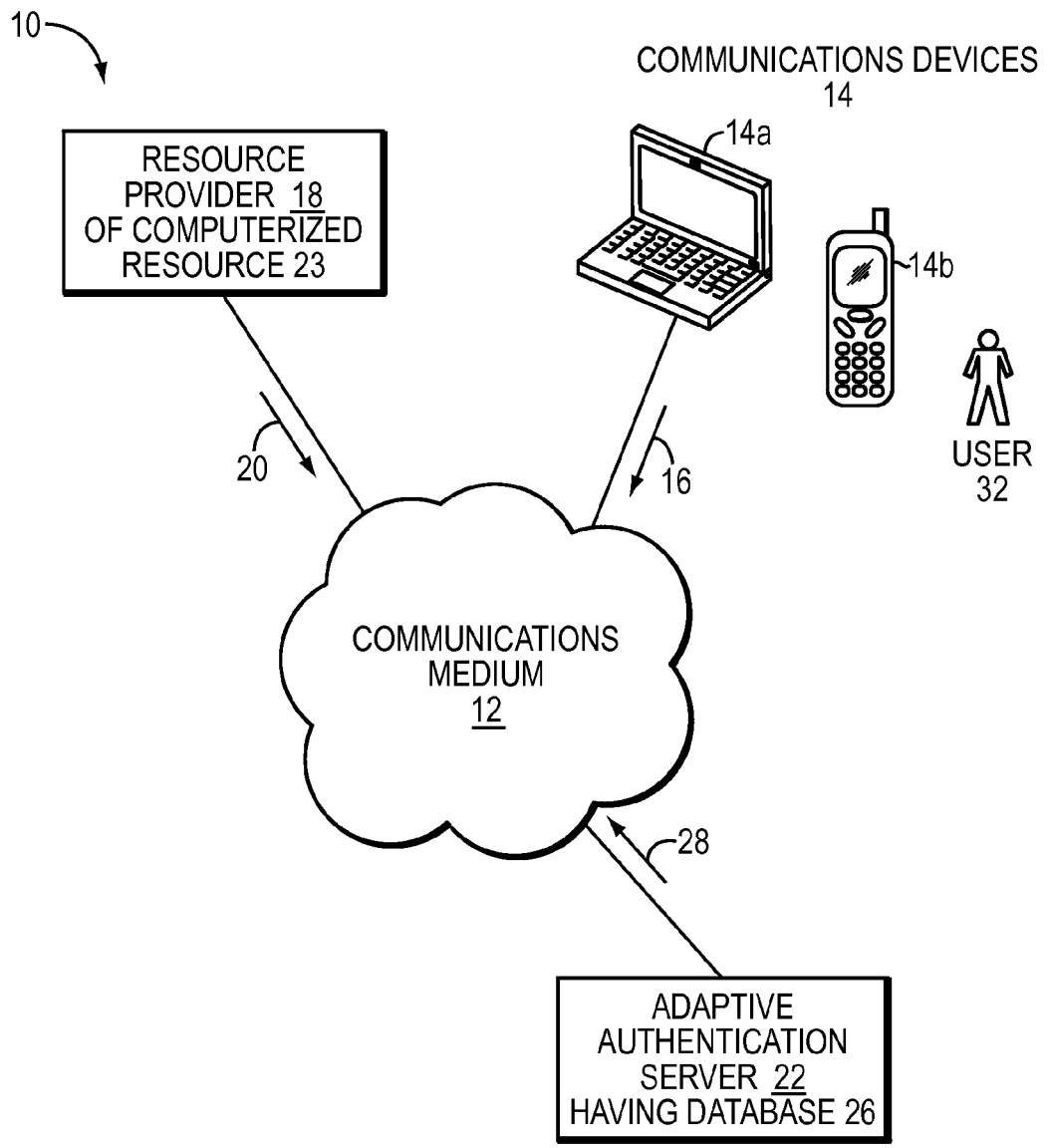
FIG. 1 is a diagram illustrating an example environment for implementing the technique as described herein.

Referring to FIG. 1, there is illustrated an example environment 10 for implementing the technique of authenticating an entity. It will be understood that the entity can be a human user. The environment 10 comprises a plurality of communications devices 14, a communications medium 12, a resource provider 18 and an adaptive authentication server 22.

The communications devices 14 can be smartphones, personal digital assistants, laptop computers, desktop computers, tablet computers, cameras, MP3 players, portable game systems, and the like constructed and arranged to submit an authentication request 16 to the resource provider 18 via the communications medium 12 which then delegates the authentication task to the adaptive authentication server 22. However, it will be appreciated that in some embodiments the authentication request 16 may be sent direct to the adaptive authentication server 22 over the communications medium 12 rather than indirectly through the resource provider 18. It will also be appreciated that the authentication request may comprise a username or user identifier in order to facilitate identification of the user.

It will be understood that during at least one embodiment of the technique described herein a user 32 may comprise both a laptop computer 14a and a communications device 14b with GPS capability or other location determining capability. For example, the communications device 14b can be a mobile wireless communications device such as a smartphone. It will be appreciated that in this embodiment the laptop computer 14a may facilitate access to the resource provider 18 via the communications medium 12 and the smartphone 14b may perform its normal functionality. However, it will be appreciated that the above example is for illustration purposes only as it will be evident that the smartphone 14b may also be configured to facilitate access to the resource provider 18 as well as perform its normal functionality. In such a scenario, the laptop 14a may be superfluous for the purposes of implementing the invention as described herein.

The communications medium 12 provides network connections between the communications devices 14, the resource provider 18 and the adaptive authentication server 22. The communications medium 12 can implement a variety of protocols such as TCP/IP, UDP, ATM, Ethernet, Fibre Channel, combinations thereof, and the like. Furthermore, the communications medium 12 can include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

The resource provider 18 can provide the user 32 of the communications devices 14 with access to one or more computerized resources 23 following successful user authentication. An example of a suitable resource provider 18 is a data storage array which provides secure access to files, directories, volumes, LUNs, etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

The adaptive authentication server 22 as will be described in further detail below is configured to receive an authentication request 20 from the resource provider 18 over the communications medium 12. It will be appreciated from the foregoing that the adaptive authentication server 22 may in some embodiments receive the authentication request direct from the communications device 14. In either embodiment, the authentication request is sent to the adaptive authentication server 22 in order to authenticate the identity of the user 32 by performing risk-based authentication.

It will also be understood that in this embodiment the adaptive authentication server 22 includes a database 26 for storing records or details with respect to an event. It will be understood that the event may have yet to occur or may currently be occurring or may occur sometime in the future. In this embodiment, the event details can be manually entered into the database by an administrator of the server 22. However, it will also be appreciated that the event details can also be obtained by machine learning techniques or data mining.

It will be further understood that the adaptive authentication server 22 is configured for performing risk-based assessment by deriving the current location of the smartphone 14b and performing an analysis between the current location and the event as will be described in further detail below. It will be still further understood that in this embodiment the adaptive authentication server 22 is constructed and arranged to send an adaptive authentication result 28 to the resource provider 18 via the communications medium 12 on completion of the risk based authentication in the server 22 in order to grant or deny authentication to the computerized resource 23.

Figure 2:
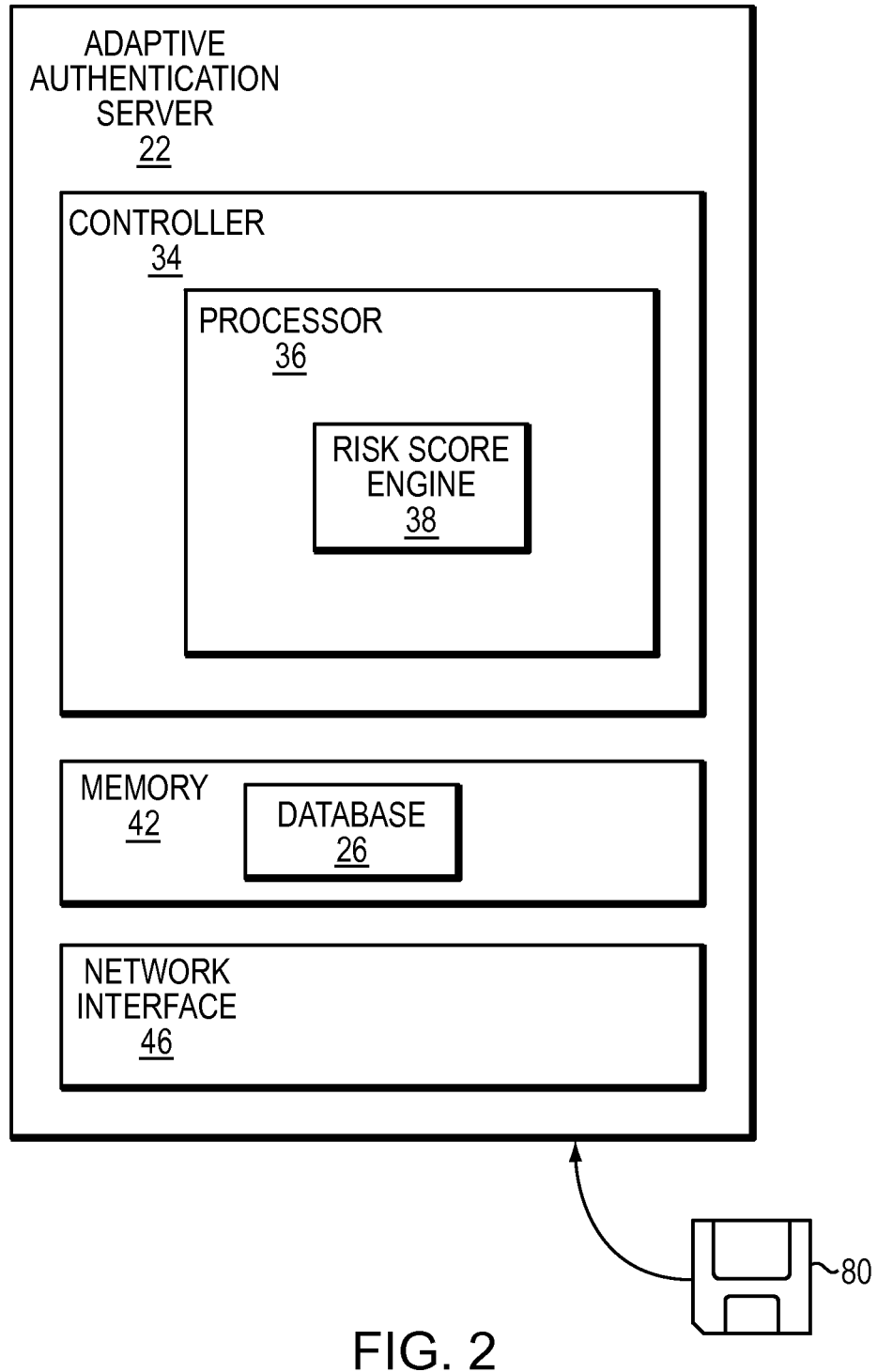
FIG. 2 is a diagram illustrating an example adaptive authentication server within the environment illustrated in FIG. 1.

Referring to FIG. 2, there is illustrated the components of the adaptive authentication server 22. The adaptive authentication server 22 comprising a network interface 46, a memory 42 and a controller 34.

The network interface 46 is constructed and arranged to send and receive data over the communications medium 12. Specifically, in this embodiment, the network interface 46 is configured to receive authentication request 20 from resource provider 18 over communications medium 12 and to send authentication result 28 to the resource provider 18 over communications medium 12.

The memory 42 is configured to store the database 26 which includes event data which can include discrete locations of events as well as the time of events. It will be appreciated as discussed previously that an administrator can input the event data into the database 26 of the adaptive authentication server 22. For example, the event data may be a sporting event, a protest event, a cultural event, a musical event, a social event and/or a celebratory event. Additionally, or alternatively, the event may a criminal act committed prior to the request for authentication. For example, the event may be a fraudulent event that occurred at a certain location prior to the request for authentication. It will also be understood that the database 26 can be configured for storing multiple data entries with each data entry including an event identifier, event location details and a timestamp. For example, the database 26 can comprise data entries associating a government protest event, the geolocation co-ordinates of the protest event and the date/time of the protest event. It will be further appreciated that the database may be updated periodically. The memory 42 generally takes the form of, e.g., random access memory, flash memory or a non-volatile memory.

The controller 34 includes a processor 36 which takes the form of, but is not limited to, Intel or AMD-based MPUs, and can include a single or multi-cores each running single or multiple threads. The processor 36 is coupled to memory 42 and includes a risk score engine 38 constructed and arranged to assign a risk score to an authentication request based on the event in the database 26 and the current location of the communications device 14b.

At this point, it should be understood that the controller 34 of the authentication server 22 is capable of being implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product is capable of delivering all or portions of the software. The computer program product 80 has a non-transitory (or non-volatile) computer readable medium which stores a set of instructions which controls one or more controller operations. Examples of suitable computer readable storage media include tangible articles of manufacture and apparatus which store instructions in a non-volatile manner such as CD-ROM, flash memory, disk memory, tape memory, and the like.

Figure 3:
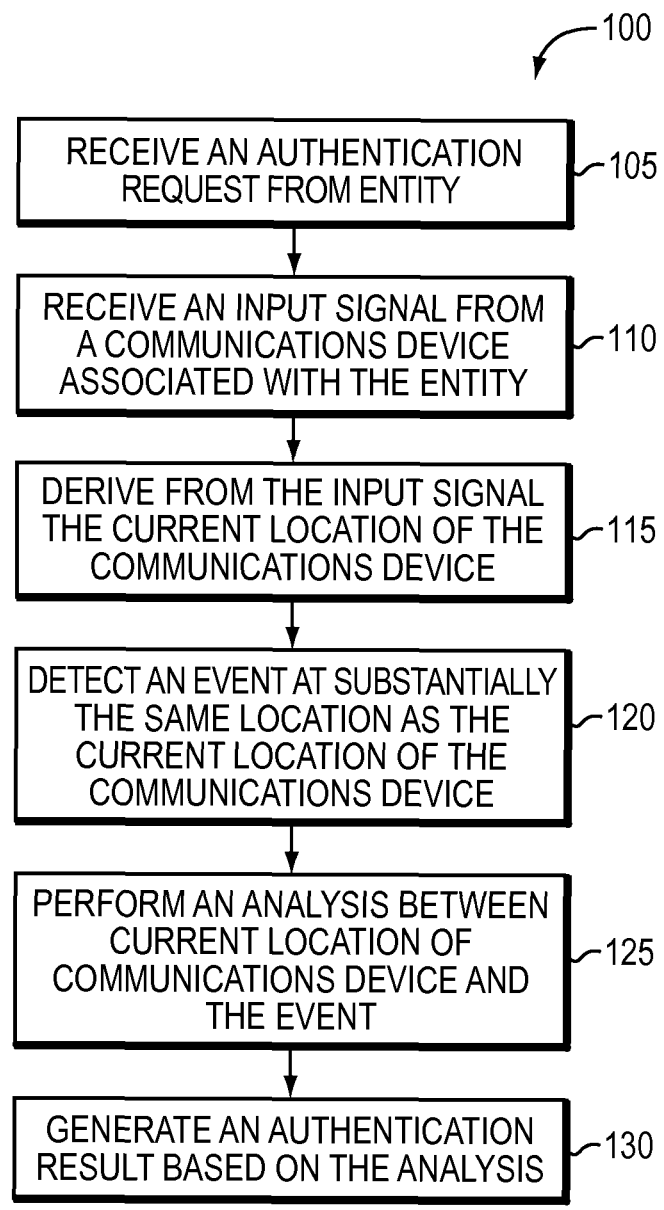
FIG. 3 is a flowchart summarizing the steps of a technique for use in authenticating an entity.

Referring to FIG. 3, there is illustrated a technique 100 for use in authenticating an entity. It will be appreciated that in this embodiment the entity is a human user. The technique comprises receiving 105 an authentication request from the user. For example, the user 32 may send an authentication request 16 using the laptop computer 14a to the resource provider 18 of computerized resource 23 for access to the computerized resource 23. The authentication request 16 is sent to the resource provider 18 over the communications medium 12 before the resource provider 18 sends an authentication request 20 to the authentication server 22. It will be understood that the authentication request 20 may be received in the authentication server 22 by the network interface 46.

Additionally, the technique comprises receiving 110 an input signal from a communications device such as the smartphone 14b associated with the user. The input signal comprises the current location of the communications device 14b which is assumed to emulate the location of the user. The input signal may also comprise a timestamp indicating the time at which the location was determined by the communications device 14b. It will be appreciated that the input signal is received in the adaptive authentication server 22 over the communications network 12 by the network interface 46 and saved in memory 42. For example, the authentication server 22 may receive the input signal by requesting the current location of the communications device 14b in response to receiving the authentication request 20 from the user 32 in the authentication server 22. The communications device 14b, in accordance with the technique as described herein, can be configured for transmitting the current location of the device 14b in response to receiving the request from the authentication server 22.

The technique comprises deriving 115 from the input signal the current location of the communications device. For example, the processor 36 can be configured for deriving the current location of the communications device 14b from the received input signal. It will be appreciated that the location may be geolocation co-ordinates in connection with the device 14b. However, it will also be appreciated that in some embodiments, the current location may be the location of the device 14b with respect to another device. For example, the other device may be a Wi-Fi access point, a RFID reader and the like. Based on the type of device, transmission power, and propagation characteristics, the technique can infer the accuracy of the location with respect to the other device. In some embodiments, the received input signal may include both geolocation co-ordinates and one or more indications of identity of another device and one or more indications of radio type, transmission power, and propagation characteristics.

In some embodiments, the laptop and device 14b may communicate with the server 22 over a plurality of communication media 12. It will be appreciated that various media may be considered by the server to be more or less risky. For example, a network route to device 14b that traverses the Internet before arriving at a marketer of residential Internet services such as a cable TV provider may cause the server to modify transaction risk score up or down accordingly. In another embodiment, the network route may include a cellular telephone provider which also may cause the server to modify the risk score.

The technique comprises detecting 120 an event at substantially the same location as the current location of the communications device 14b based on the current location of the communications device 14b as derived from the input signal. It will be understood that the event is characterized by a temporary influx of people to substantially the same location as the current location of the communications device 14b. Additionally, it will be appreciated that the event occurs at substantially the same location as the current location of the communications device 14b at substantially the same time as the communications device 14b is located at the current location. It will be further understood that the event occurs at substantially the same location as the current location of the communications device 14b in response to the current location of the communications device being derived from the input signal as being within a predetermined radius of the event. For example, the current location and the location of the event may be in the same metropolitan area. It will be further appreciated that the adaptive authentication server 22 can store event data in the database 26 in memory 42 by manually inputting the event data as discussed above.

The technique comprises performing 125 an analysis between the current location of the communications device 14b and the event. For example, the processor 36 performs an analysis between the derived current location and event data stored in the database 26. This will be described in further detail below.

The technique comprises generating 130 an authentication result based on the analysis between the current location of the communications device 14b and the event. It will be appreciated that the authentication result can be used for authenticating the user. The generation of the authentication result comprises outputting, as an authentication signal, a risk score based on at least one risk factor. It will be appreciated that in this embodiment the result of the analysis between the current location of the communications device and the event is one factor. For example, in this embodiment, the risk score may form part of the adaptive authentication result 28 sent to the resource provider 18 via the communications medium 12. The risk score may grant authentication in response to the risk score exceeding a predefined threshold and denying authentication in response to the risk score not exceeding the predefined threshold. It will be understood that the generated authentication result can represent a high risk in response to the analysis performed indicating the event occurs at substantially the same location as the current location of the communications device at substantially the same time as the communications device is located at the current location. Conversely, if the event has finished or is not due to occur for a few weeks the risk score can represent a low risk.

Figure 4:
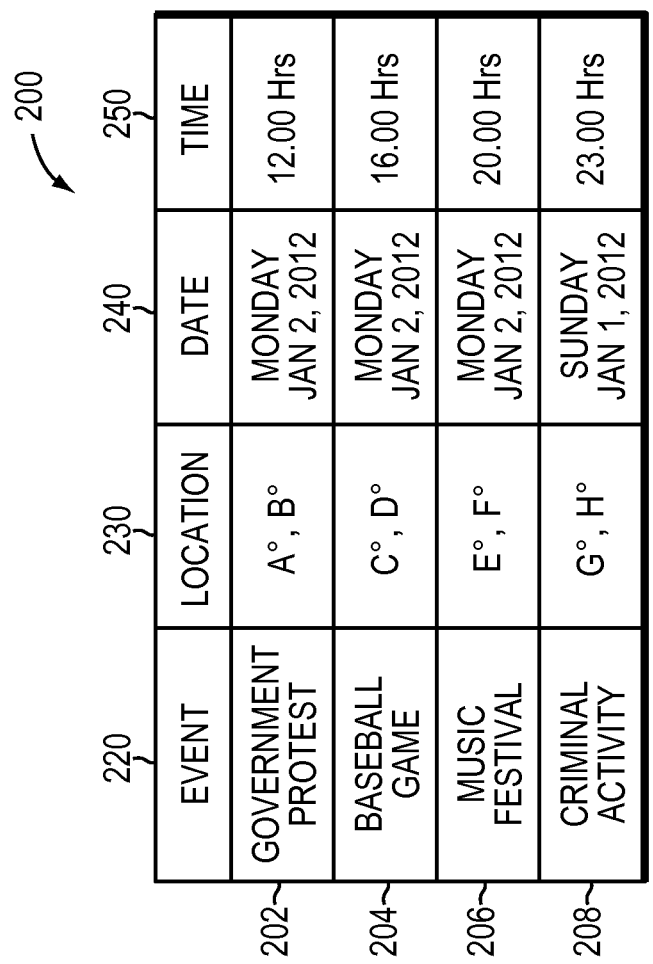
FIG. 4 is a diagram illustrating an example table showing records with respect to an event.

Referring to FIG. 4, there is illustrated an example of a table showing records with respect to an event 200. For example, the records may be similar to that as stored in the database 26 in the adaptive authentication server 22. It will be understood that the records comprise multiple data entries (202, 204, 206, 208) of events. It will also be understood that each data entry comprises an event identifier 220, location information 230, date 240 and time 250. It will be understood from the figure that the record 200 relates to dates and times which have been chosen for illustration purposes only. It will also be understood from the foregoing that the data may have been collected by an administrator and submitted to the authentication server 22 to be saved in the database 26.

It can be seen from the figure that the data entry 202 relates to a government protest located at co-ordinates A° B° (longitude, latitude) on Monday Jan. 2, 2012 at 12.00 hours. It can also be seen that data entry 204 relates to a baseball game located at co-ordinates C° D° (longitude, latitude) on Monday Jan. 2, 2012 at 16.00 hours. It can also be seen that data entry 206 relates to a music festival located at co-ordinates E° F.° (longitude, latitude) on Monday Jan. 2, 2012 at 20.00 hours. It can also be seen that data entry 208 relates to a criminal act located at co-ordinates G° H° (longitude, latitude) on Sunday Jan. 1, 2012 at 23.00 hours. In this embodiment, the latter entry 208 may differ from the other entries in that it has already occurred and being reported. The other entries may be entries which the administrator is aware will occur in, for example, a metropolitan area on Monday Jan. 2, 2012. It will be appreciated that the entries in the table may have been made on Monday morning Jan. 2, 2012.

It will be understood from the foregoing that the risk score generated by the risk engine 38 depends on the current location of the communications device and the location of the event. It will also be understood that the risk score depends on the time associated with the event and the time the communications device is at the current location. For example, if the user sends an authentication request at 12.00 hours on Monday Jan. 2, 2012, the technique will endeavor to derive the location of the communications device 14b which it is assumed emulates the location of the user. If the technique derives that the current location of the communications device is at a location substantially similar to co-ordinates A° B° the technique may generate a high risk score. In such a scenario, the technique may deny authentication. In a further example, if the technique derives that the current location of the communications device is at G° H° the technique may generate a high risk score as it may be considered that as there has been a criminal act in the location it is reasonable to generate a high risk score.

It will be appreciated that the authentication request or input signal may have a timestamp associated therewith enabling analysis by the processor 36 with the event at that particular time. The risk engine 38 will generate a risk score based on the analysis.

It will be appreciated from the above that the adaptive authentication server may be configured for manually accepting the event details in the database. However, it will also be appreciated that machine learning techniques may be used in conjunction with calendars of local events and news reports. It will be further understood that such details may be widely available on the internet and that machine learning techniques may consult these resources at any time and continually update a profile of risky locations.

It will be appreciated that the adaptive authentication server may be configured to include a user profile. For example, if the user has never left the U.S.A., the aforementioned travel detail with respect to the user will be included in the user profile meaning that if the current location of the communications device is in Europe the risk engine can be configured to generate a much higher risk score.

It will also be appreciated that the adaptive authentication server may be configured for recognizing that certain locations are of a greater threat. For example, it will be appreciated that certain countries, or areas within a metropolitan area, tend to be of greater threat than others. The risk engine may be configured to take this into account when generating a risk score. In addition, it will be appreciated that certain countries or areas within a metropolitan area may be transiently subject to additional risk factors. For example, as discussed above, a temporary influx of people may be expected in an area due to a large sporting event, concert or the like.

While the above description refers to the technique detecting events such as sporting events which are characterized by an influx of people to a location, it will also be understood that a temporary spike in the number of authentication requests from substantially the same location can indicate an event. For example, if a number of failed authentication requests have occurred in a location substantially similar to the current location of the communications device the riskiness of the authentication request may be considered higher.

While the above technique describes determining the location of the communications device such as the geolocation co-ordinates, it will be appreciated that the location may be the location of the device with respect to another device. For example, the communications device may typically be accompanied by another device which enables communication therebetween. It will be understood that such information may used in authenticating the entity.

While the above technique describes receiving the current location of the communications device, it should be understood that the technique may receive a plurality of current location signals enabling the technique to determine if the user is moving and at what speed and in which direction. This information may be subsequently used to assist in the authentication of the user.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in authenticating an entity, the method comprising steps of:
   receiving a request to authenticate the entity, the request comprising a current location of a communications device associated with the entity and a current time;
   based on the current location and the current time, evaluating event data to detect an event at an event location within a defined radius of the current location and an event time with a defined time period of the current time, wherein the event data comprises one or more entries including an event type, an event location and a timestamp, wherein the event type relates to one or more of a sporting event, a protest event, a cultural event, a musical event, a social event, a celebratory event, and a criminal event;
   determining a location difference and a time difference in connection with the event, wherein the location difference relates to a difference between the current location and the event location and the time difference relates to a difference between the current time and the event time;
   determining a risk score in connection with the request, wherein the risk score is dependent on the event type and the location difference and the time difference, further wherein the said determination of the risk score determines the extent of the location difference and the time difference such that the risk score will be higher when the current location and the current time are similar to the event location and the event time and the risk score will be lower than said higher risk score when one or more of the current location and the current time are dissimilar to the event location and the event time, the degree to which the risk score is lower being dependent on the extent of at least one of the location difference and the time difference; and based on the risk score, generating an authentication result for use in authenticating the entity; and wherein the steps are performed by at least one processing device comprising a processor coupled to a memory.

2. The method as claimed in claim 1, further comprising:

granting authentication in response to the risk score not exceeding a predefined threshold; and denying authentication in response to the risk score exceeding the predefined threshold.

3. A system for use in authenticating an entity, the system comprising a processor configured to:

receive a request to authenticate the entity, the request comprising a current location of a communications device associated with the entity and a current time;

based on the current location and the current time, evaluate event data to detect an event at an event location within a defined radius of the current location and an event time with a defined time period of the current time, wherein the event data comprises one or more entries including an event type, an event location and a timestamp, wherein the event type relates to one or more of a sporting event, a protest event, a cultural event, a musical event, a social event, a celebratory event, and a criminal event;

determine a location difference and a time difference in connection with the event, wherein the location difference relates to a difference between the current location and the event location and the time difference relates to a difference between the current time and the event time;

determine a risk score in connection with the request, wherein the risk score is dependent on the event type and the location difference and the time difference, further wherein the said determination of the risk score determines the extent of the location difference and the time difference such that the risk score will be higher when the current location and the current time are similar to the event location and the event time and the risk score will be lower than said higher risk score when one or more of the current location and the current time are dissimilar to the event location and the event time, the degree to which the risk score is lower being dependent on the extent of at least one of the location difference and the time difference; and based on the risk score, generate an authentication result for use in authenticating the entity.

4. The system as claimed in claim 3, further comprising:

grant authentication in response to the risk score not exceeding a predefined threshold; and deny authentication in response to the risk score exceeding the predefined threshold.

\* \* \* \* \*